United States Patent
Schuler

[11] 3,860,744
[45] Jan. 14, 1975

[54] INSULATED CONDUCTOR BAR STRUCTURE FOR STATOR WINDING OF HIGH-VOLTAGE DYNAMO-ELECTRIC MACHINE

[75] Inventor: Roland H. Schuler, Wettingen, Switzerland

[73] Assignee: BBC Brown Boveri & Company Limited, Baden, Switzerland

[22] Filed: June 13, 1973

[21] Appl. No.: 369,467

[30] Foreign Application Priority Data
June 20, 1972 Switzerland.................. 9181/72

[52] U.S. Cl............ 174/117 FF, 174/119, 336/205, 336/223, 310/201, 310/208
[51] Int. Cl. ............................................. H01b 7/08
[58] Field of Search ...... 336/96, 205, 223; 310/201, 310/208; 174/117 FF, 119

[56] References Cited
UNITED STATES PATENTS
| | | | |
|---|---|---|---|
| 1,529,973 | 3/1925 | Underhill | 336/205 |
| 1,675,419 | 7/1928 | Myers | 336/205 X |
| 1,808,749 | 6/1931 | Apple | 310/201 |
| 3,388,363 | 6/1968 | Novick | 336/96 |

FOREIGN PATENTS OR APPLICATIONS
| | | | |
|---|---|---|---|
| 312,217 | 5/1929 | Great Britain | 310/208 |

*Primary Examiner*—E. A. Goldberg
*Attorney, Agent, or Firm*—Pierce, Scheffler & Parker

[57] ABSTRACT

A conductor bar structure for forming the stator winding of a high-voltage dynamo-electric machine comprises at least one stack of bar type bare conductors which have an elongated rectangular transverse profile and which is enclosed within a sheath of insulating material. To facilitate penetration of an impregnating resin into the stacked conductor bar structure longitudinally extending flow channels are provided between the narrow sides of the conductor bars and the insulating sheath. These channels can be established by profiling the narrow sides of the conductor bars such as in a concave or convex manner of a combination of both, or by use of conductor bars having dissimilar widths. One or more of the conductor bars may also be made in tubular form and provided with longitudinally spaced apertures through the narrow side thereof facing the insulating sheath for introduction of the impregnating resin.

12 Claims, 4 Drawing Figures

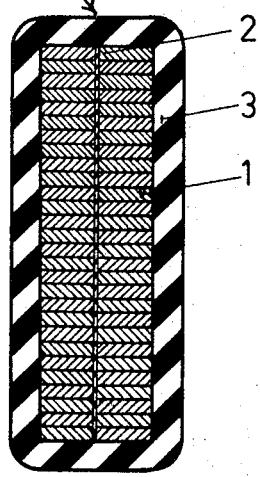
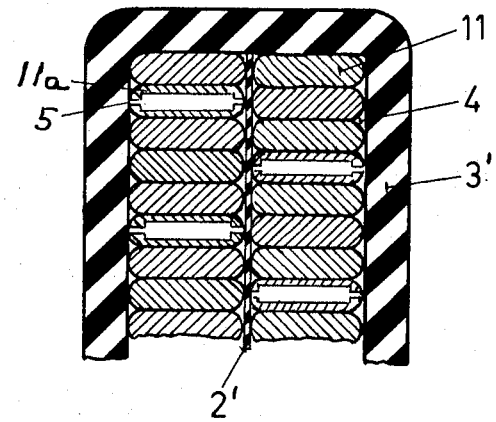
Fig.1  Fig.2
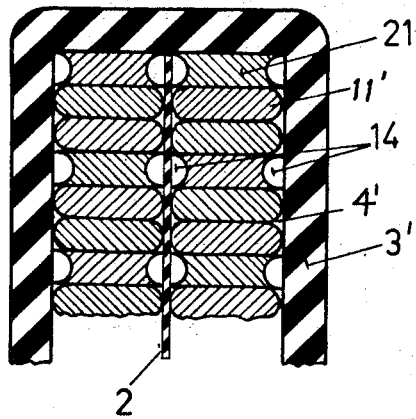
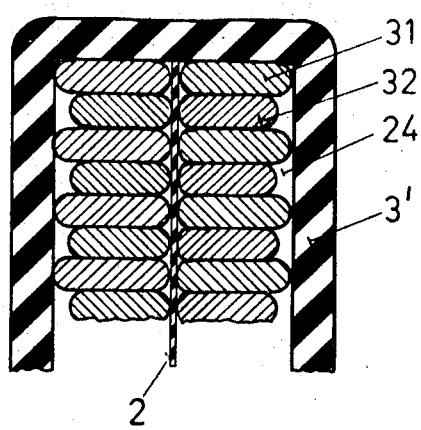
Fig.3  Fig.4

INSULATED CONDUCTOR BAR STRUCTURE FOR STATOR WINDING OF HIGH-VOLTAGE DYNAMO-ELECTRIC MACHINE

This invention relates to an improvement in the construction of an insulation sheathed conductor structure for forming the windings installed in the stator element of a high-voltage dynamo-electric machine. The invention relates more particularly to conductor structure of the type which comprises one or more mutually insulated stacks of bare conductor bars which are transposed and enclosed, as a group within a main insulation sheath, and are then impregnated with a synthetic resin.

When insulated conductor bar structures of this general type are manufactured, it is highly desirable to produce conductor units having very smooth surfaces and also a high degree of compactness. For this purpose, any rough spots at the narrow sides of the conductor bars, which usually exhibit an elongated rectangular transverse profile, caused by the transposition are filled in with additional wedges or cements and the gaps between the conductor bars, which appear at their broad sides, are filled with synthetic resin at the time of the preliminary fastening, or gluing together of the conductor bars. The fill-in at the narrow sides, i.e., at the bar edges, is of particular importance because the wedge pressure must have a uniform effect throughout the entire length of the conductor bar structure when installed in the slots provided in the stator of the machine. It thus becomes possible for the principal insulation sheathing enclosing the one or more conductor bar stacks forming each conductor unit then to bear fully and closely against the conductor bars thereby eliminating any possibility of any voids or air pockets from being present.

The principal object of the present invention is to provide an improved stacked and insulated conductor bar structure which facilitates penetration of impregnating resin into the insulation sheath enclosed stacks of conductor bars. This is accomplished principally by structuring the narrow sides of the individual conductor bars in such manner as to establish channels extending longitudinally of the stacked conductor bars between these narrow sides and the surrounding insulation sheath into which the impregnating resin can be introduced.

In the accompanying drawings:

FIG. 1 illustrates a conventional two-stack insulation sheathed conductor bar structure in transverse section; and FIGS. 2, 3 and 4 illustrate, in transverse section, different embodiments of an insulation sheathed two-stack conductor bar structure in accordance with the present invention.

With reference to a conventional "Roebel" type transposed bar conductor structure of FIG. 1, it will be seen that two stacks of bare conductor bars 1 having an elongated rectangular transverse profile are arranged in side-by-side relation and separated by insulation 2. The two stacks of conductor bars are enclosed within an insulating sheath 3 which lies flush against the narrow sides of the conductor bars.

Due to the increase in use of winding machinery, and the utilization of insulation tape material having a high tensile strength, insulation coils having a high degree of compactness can be readily attained, a required feature for the principal insulation sheaths on conductor bars which form the stator windings of high voltage machines. Since the power output of these machines has steadily increased throughout the years, such machines and consequently also the conductor bars which form the coils of the stator winding, have become longer and longer. An impregnation of the insulation as in the conventional case, FIG. 1, thus becomes increasingly difficult under these conditions, and especially so if the surfaces of the conductor bars are pressed into a high degree of smoothness, due to the pre-gluing of the conductor elements, the reason being that the impregnating medium, i.e., the synthetic resin must primarily penetrate the main insulating sheath in the longitudinal direction of the conductor bars.

With reference now to FIG. 2, the improved arrangement is basically the same as that of FIG. 1 so far as stacking together of the individual conductor bars is concerned. Thus, two stacks of bare conductor bars 11 arranged in side-by-side i.e., in contiguous relation with an insulating layer 2' located between the adjacent stacks. The conductor bars are seen to have an elongated configuration in transverse section which is essentially rectangular, but with the opposite narrow sides of the bars profiled by rounding them off convexly thereby to establish flow channels 4 between the narrow sides of the bars and the surrounding insulation 3' for penetration of the impregnating medium, introduced longitudinally of the insulated conductor bar assembly, this medium being a synthetic resin, as presently known in this art.

In the embodiment illustrated in FIG. 3, the same two-stacking arrangement of flat conductor bars is utilized with insulation 2' between the stacks. However, instead of rounding off the narrow sides of all of the conductor bars in a convex manner, as in FIG. 2, the rounding-off is effected in such manner that some of the bars include a convex curvature while others have a concave curvature. Thus, the bar stacking is such that each set of two adjacent bars 11' have convexly curved narrow sides as in FIG. 2 to establish channels 4' between the sides of the bars and the surrounding insulation sheath 3' for insertion of the impregnating resin while bars 21 having concavely curved sides are interposed between the bars 11' to establish essentially semi-circular channels 14 for flow of the impregnating resin. In the case of this embodiment it is also feasible to make only one narrow side of the conductor bars curved concavely.

In FIG. 4 which illustrates still another embodiment for establishing flow channels for the impregnating resin between the conductor bars and the outer insulating covering, the conductor bars in each of the adjacent stacks alternate in width and the narrow sides of all the bars are rounded off in a convex manner. However, the wider bars 31 in each stack reach from the intermediate insulating element 2' between the two stacks all the way to the insulating sheath 3', whereas, the narrower bars 32 in each stack, which alternate with the wider bars 31, terminate short of the insulating sheath 3' thus establishing longitudinally extending flow channels 24 for the impregnating resin.

One or more of the conductor bars can be provided with passageways extending through them, i.e., tubular bars can be used in each stack which can be used later for circulating a cooling medium through the conductors. The narrow sides of the one or more elongated rectangular tubular conductors, i.e., the sides facing either the main insulation sheath and/or the insulation wall separating adjacent conductor stacks, are thus provided with apertures for discharge of the impregnating medium into the longitudinally extending channels 4, 14 or 24 of any of the embodiments of FIGS. 2 to 4 existing between the conductor bars and the insulation 2', 3'. The use of tubular bar structures is illustrated, for example, in FIG. 2 wherein it will be seen that some of the conductors i.e., conductors 11a in both stacks are tubular and are provided with longitudinally spaced apertures 5 along their narrow sides facing the insulation sheath 3' and insulation wall 2'.

When impregnation of the conductor bars has been completed, the longitudinally extending channels between the insulation and conductor bars are closed off, either by filling the channels with resin, or deformation inwardly of the walls of the main insulation 3' itself to lie against the narrow sides of the convexly or concavely rounded conductor bars, thereby assuring an insulation sheath enclosed conductor bar structure which is completely free of any cavities.

I claim:

1. In a conductor bar structure for forming the stator winding of a high-voltage dynamo-electric machine which comprises at least one stack of contiguous bar type bare conductors, each conductor of the stack having an elongated essentially rectangular cross-section and which is enclosed within a sheath of insulating material, the improvement wherein the narrow sides of said conductor bars profiled to establish longitudinally extending flow channels between the narrow sides of said conductor bars and the surface of said insulating sheath to facilitate penetration of an impregnating resin.

2. A conductor bar structure as defined in claim 1 wherein the narrow sides of said conductor bars have a convex profile.

3. A conductor bar structure as defined in claim 1 wherein the narrow sides of said conductor bars have a concave profile.

4. A conductor bar structure as defined in claim 1 which comprises two stacks of bars arranged in side-by-side relation with an insulation barrier therebetween, and wherein said longitudinally extending channels between the narrow sides of said conductor bars and said insulating sheath are established by profiling the opposite narrow sides of each said conductor bar.

5. A conductor bar structure as defined in claim 4 wherein the opposite narrow sides of said conductor bar have a convex profile.

6. A conductor bar structure as defined in claim 4 wherein the opposite narrow sides of some of said conductor bars have a convex profile and wherein the opposite narrow sides of other conductor bars disposed adjacent bars with the convex profile have a concave profile.

7. A conductor bar structure as defined in claim 6 wherein each conductor bar in the stack having opposite narrow sides profiled concavely is located between two other conductor bars whose opposite narrow sides are profiled convexly.

8. In a conductor bar structure for forming the stator winding of a high-voltage dynamo-electric machine which comprises at least one stack of contiguous bar type bare conductors, each conductor of the stack having an elongated essentially rectangular cross-section and which is enclosed within a sheath of insulating material, the improvement wherein longitudinally extending channels between the narrow sides of said conductor bars and the surface of said insulating sheath are established by conductor bars having dissimilar widths thereby to facilitate penetration of an impregnating resin.

9. A conductor bar structure as defined in claim 8 wherein conductor bars of different width alternate in the stack.

10. A conductor bar structure as defined in claim 8 which comprises two stacks of bars arranged in side-by-side relation with an insulation barrier therebetween, and wherein said longitudinally extending channels between the narrow sides of said conductor bars and said insulating sheath are established by conductor bars of dissimilar width in each stack, the narrower bars being located between the wider bars and having one narrow side thereof in contact with said insulation barrier, said wider bars likewise having one narrow side thereof in contact with said insulation barrier and the opposite narrow side thereof in contact with said insulating sheath.

11. A conductor bar structure as defined in claim 10 wherein the narrow sides of all of said conductor bars are profiled convexly.

12. A conductor bar structure as defined in claim 1 wherein at least some conductor bars are tubular and provided with longitudinally spaced apertures extending through the narrow side thereof facing the inner surface of said insulating sheath.

* * * * *